(No Model.)

J. J. McERLAIN.
BICYCLE FORK.

No. 421,748. Patented Feb. 18, 1890.

WITNESSES:
Will E. Aughinbaugh
Arthur E. Dowell

INVENTOR
John J. McErlain
BY
T. H. Alexander
ATTORNEY.

N. PETERS, Photo-Lithographer, Washington, D. C.

UNITED STATES PATENT OFFICE.

JOHN J. McERLAIN, OF SOUTH BEND, INDIANA.

BICYCLE-FORK.

SPECIFICATION forming part of Letters Patent No. 421,748, dated February 18, 1890.

Application filed August 14, 1889. Serial No. 320,702. (No model.)

*To all whom it may concern:*

Be it known that I, JOHN J. MCERLAIN, of South Bend, in the county of St. Joseph and State of Indiana, have invented certain new and useful Improvements in Bicycle Spring-Forks; and I do hereby declare that the following is a full, clear, and exact description thereof, reference being had to the accompanying drawings, and to the letters of reference marked thereon, which form part of this specification, in which—

Figure 1:
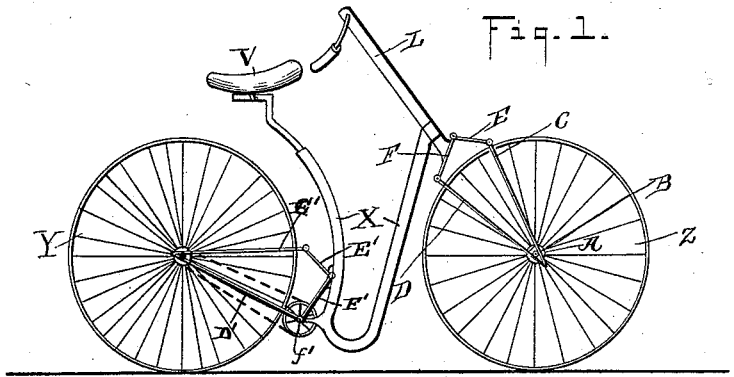
Figure 2:
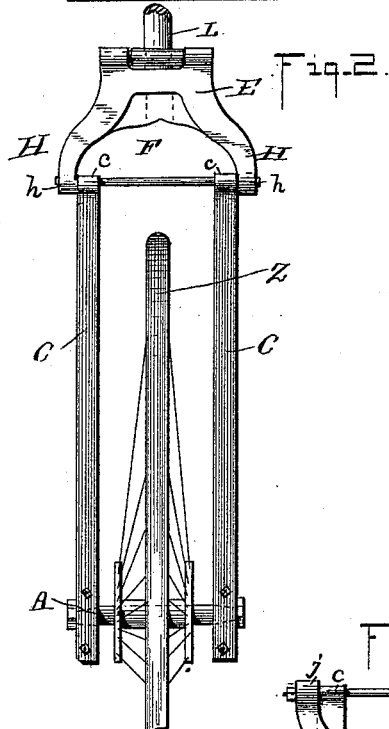
Figure 3:
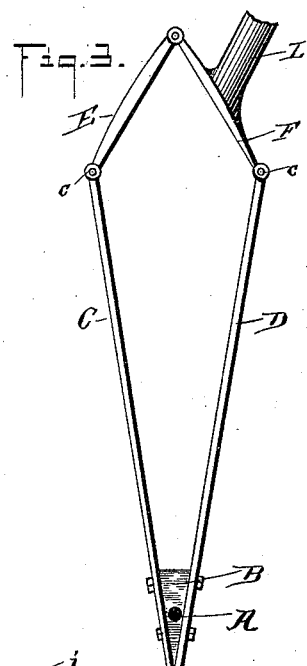
Figure 4:
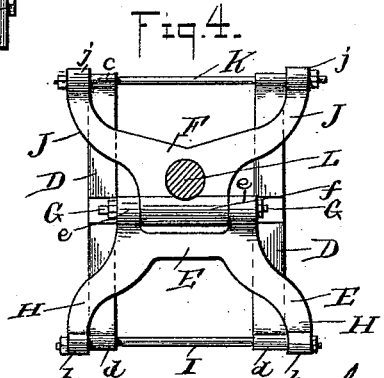

Figure 1 is a side elevation of a bicycle, showing my improved spring supports or forks. Fig. 2 is a front view, enlarged, of the front spring-fork applied to the wheel. Fig. 3 is a side view, enlarged, thereof. Fig. 4 is a detail plan view thereof.

This invention is an improvement in bicycles and similar vehicles, and its object is to provide a spring-support for the saddle-bar; and it consists in the peculiar construction of the forks of the bicycle front or rear wheel, or both, said forks consisting of bars rigidly connected at one point and adjustably connected at another point by adjustable or yielding toggle-joints, whereby weight superimposed upon said joint will distend or separate the bars and thereby utilize their resiliency to cushion the saddle-bar of the machine or seat, all of which will be clearly understood from the following description and claims.

Referring to the drawings, Fig. 1 shows a bicycle of the style known as "Safety" machines having a front wheel Z, rear wheel Y, saddle-bar X, and treadle and seat V. The front end of the saddle-bar is connected to the front wheel Z by means of my improved spring-fork, which is constructed as follows:

A designates a short shaft passing through the hubs of the wheels Y Z, and B B are angular journal-blocks on the ends of said shafts exterior to the wheels, said blocks being wedge-shaped, as shown. To the side faces of the blocks on the front wheel are rigidly secured upstanding bars C D, preferably of flat or strap spring metal, and owing to the beveled sides of the blocks the free ends of the bars diverge. The upper ends of bars C D rise above the periphery of the wheel and are provided with eyes $c\ c$, respectively. Bars C are in front of bars D, but in line therewith.

E and F designate the leaves of the toggle-joint. The leaf F has an eye $f$, which is embraced between two eyes $e\ e$ of leaf E, and G designates a bolt passing through said eyes and hinging the leaves together.

H H designate outwardly-projecting diverging arms of leaf E, which are formed with eyes $h\ h$ at their extremities, through which passes a bolt I, that also passes through eyes $d\ d$ of bars D D, thus hinging the leaf to said bars. Leaf F is similarly formed with projecting arms J J, having eyes $j\ j$ transfixed by a bolt K, that passes through eyes $c\ c$ of bars C, as shown. The toggle-joint thus adjustably or flexibly connects the pairs of bars C D and straddles the wheel, as shown. The length of the leaves of the toggle-joint is such that it is kept normally partially closed, its central part, which is bolt G, standing highest, and if any pressure is exerted to flatten the joint it will be resisted by the resiliency of spring-bars C D, which will be distended or separated more or less according to the greater or less opening and closing of joint. This will be apparent from the drawings.

L designates a handle-shaft attached to or formed with leaf F and rising therefrom, and to the upper end thereof the ordinary steering-handles can be secured. The front end of the saddle-bar X is loosely connected to said standard, as indicated in the drawings, in any suitable manner. The rider can thus turn wheel Z to turn the machine. The spring-bars C D are preferably flat and laid edgewise to the wheel, being coupled on both sides thereof, and they will hold the wheel firmly in a plane relative thereto, and will turn it therewith without vibration or torsional strain. Their elasticity will only affect the saddle-bar in its vertical movements, and owing to their peculiar connection therewith any sudden jolt or jar of the front wheel will cause the toggle-joint to distend the spring for the moment and the natural resiliency of the bars will permit the wheel to pass over obstructions without uncomfortably affecting the rider.

As applied to front wheel Z, both bars C D are elastic; but as applied to the rear wheel a modification of this construction is desirable. In this the spring-fork lies horizontal with the ground, but is connected with the wheel-shaft, as is the front fork, and the toggle-joint is connected directly to saddle-bar X below the seat. The member F' of this fork corresponds to leaf F of the front fork, and is rigidly connected to the saddle-bar, and the lowermost bar D', corresponding to bars D of the front fork, is rigid or non-elastic, but is pivoted or hinged to F' at f'. The upper leaf E' is hinged to F', and is also hinged to the upper bar C'. This construction has the effect of forcing C' upward, while the centers or pivotal points f', the axle of wheel Y, and seat V maintain a constant relative position as regards each other. The ordinary spring under the seat will sometimes raise the rider in rebounding so as to throw his feet off the pedals. This cannot happen with the spring-forks, as described. It should be understood that when one bar D' or C' is referred to its correspondent is to be understood as being on the opposite side of the wheel similarly to bars C D.

I preferably use duplex pairs of spring-bars and make the toggle-joint double-armed; but in some instances the position of the parts of the fork might be reversed—that is, the toggle-joint might be mounted on the shafts and the converging ends of the spring-bars be connected to the saddle-bar. In either case it is evident that the function and effect of the spring-bars and toggle-joint would be unaltered.

Having thus described my invention, I claim—

1. The combination of the opposite bars united at their lower ends, with a toggle-joint consisting of two leaves hinged together and connected, respectively, to the upper ends of said bars, as and for the purpose set forth.

2. The combination, with the wheel and shaft, a journal-block thereon, the opposite bars secured at one end to said block and diverging at their other ends, with the toggle-joint having its leaves respectively connected to the diverging ends of said bars, and the saddle-bar connected to said joint, substantially as and for the purpose described.

3. The combination of the journal-blocks, the opposite pairs of bars connected to said block, and the toggle-joint composed of two leaves hinged together, and each respectively connected to one bar of each pair, all substantially as described.

4. In a bicycle, the combination of a wheel having a short shaft passing through its hub, journal-blocks on said shaft, and pairs of bars connected to said blocks on opposite sides of the wheel, with a two-leaved joint, each leaf having diverging arms connected, respectively, to opposite bars of each pair, and one of said leaves having an upstanding handle-shaft, all substantially as described.

5. The combination, in a bicycle, of the front and rear wheels and the saddle-bar, with the spring-forks supporting said bar and connecting it with the wheel-axles, each fork consisting of a pair of bars united at one end and diverging at the other, and a two-leaved joint, the leaves of which are connected to the opposite bars and one leaf to the saddle-bar, as and for the purpose specified.

6. In a bicycle, the combination of the front wheel and saddle-bar, with the spring-fork consisting of pairs of spring-bars C D, the toggle-joint composed of armed leaves E and F, respectively connected to said bars, and the handle-shaft L, rising from leaf F, all substantially as specified.

7. The combination, in a bicycle, of the front and rear wheels, the saddle-bar, the pairs of diverging bars connected to journal-blocks on the axle of each wheel and on opposite sides of the wheels, and the double-leaved joints, each leaf being connected to the outer or diverging end of the similar bars of opposite pairs on the same wheel, and the connections between one leaf of each joint and the saddle-bar and the handle-bar, all constructed and arranged to operate as and for the purpose specified.

In testimony that I claim the foregoing as my own I affix my signature in the presence of two witnesses.

JOHN J. McERLAIN.

Witnesses:
JAMES DUSHANE,
WILLIS A. BUGBEE.